Jan. 21, 1941.  W. T. BIRDSALL  2,229,437
MEANS FOR PRESERVATION OF LOW TEMPERATURE REFRIGERANTS
Filed Nov. 4, 1937  2 Sheets-Sheet 2
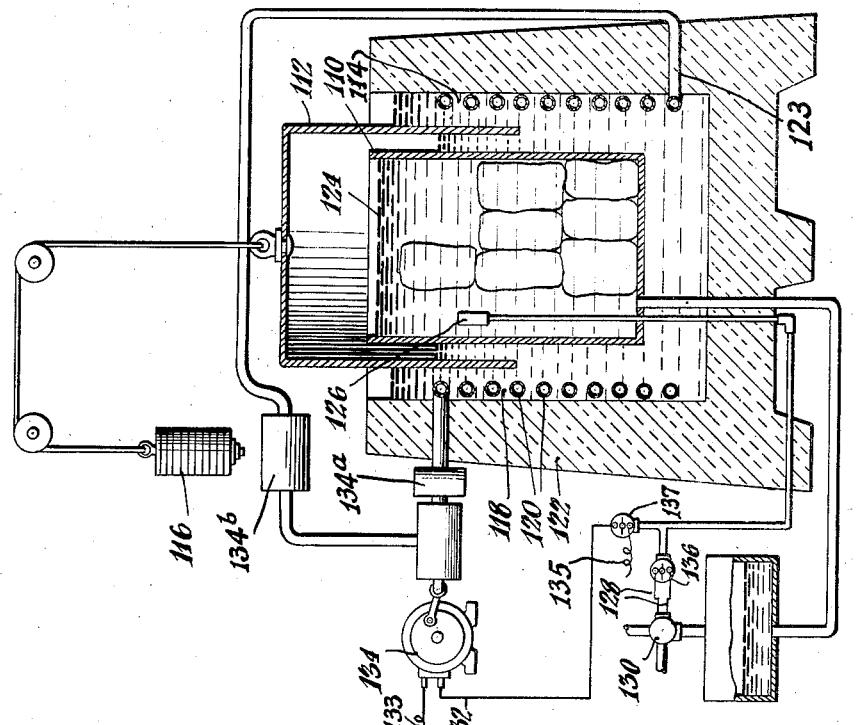
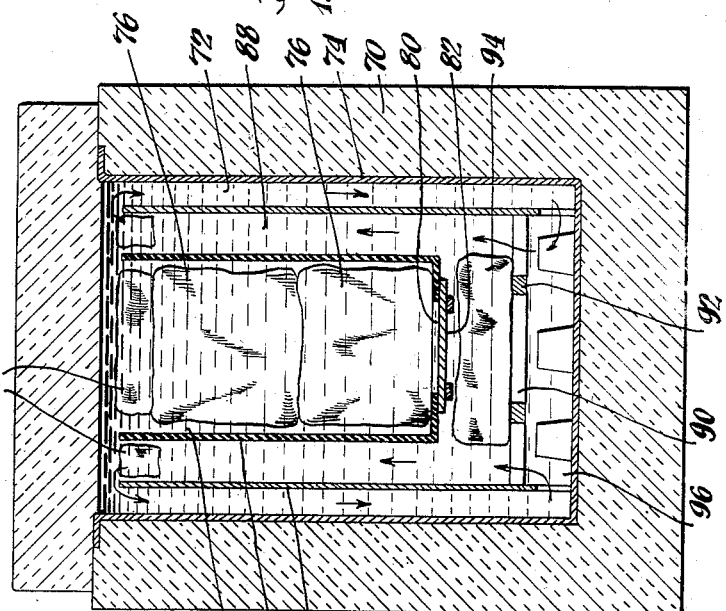
INVENTOR:
WILFRED T. BIRDSALL, DEC'D,
BY ALVIN C. BIRDSALL, ADMINISTRATOR
BY August, Meary & Campbell,
ATTORNEYS.

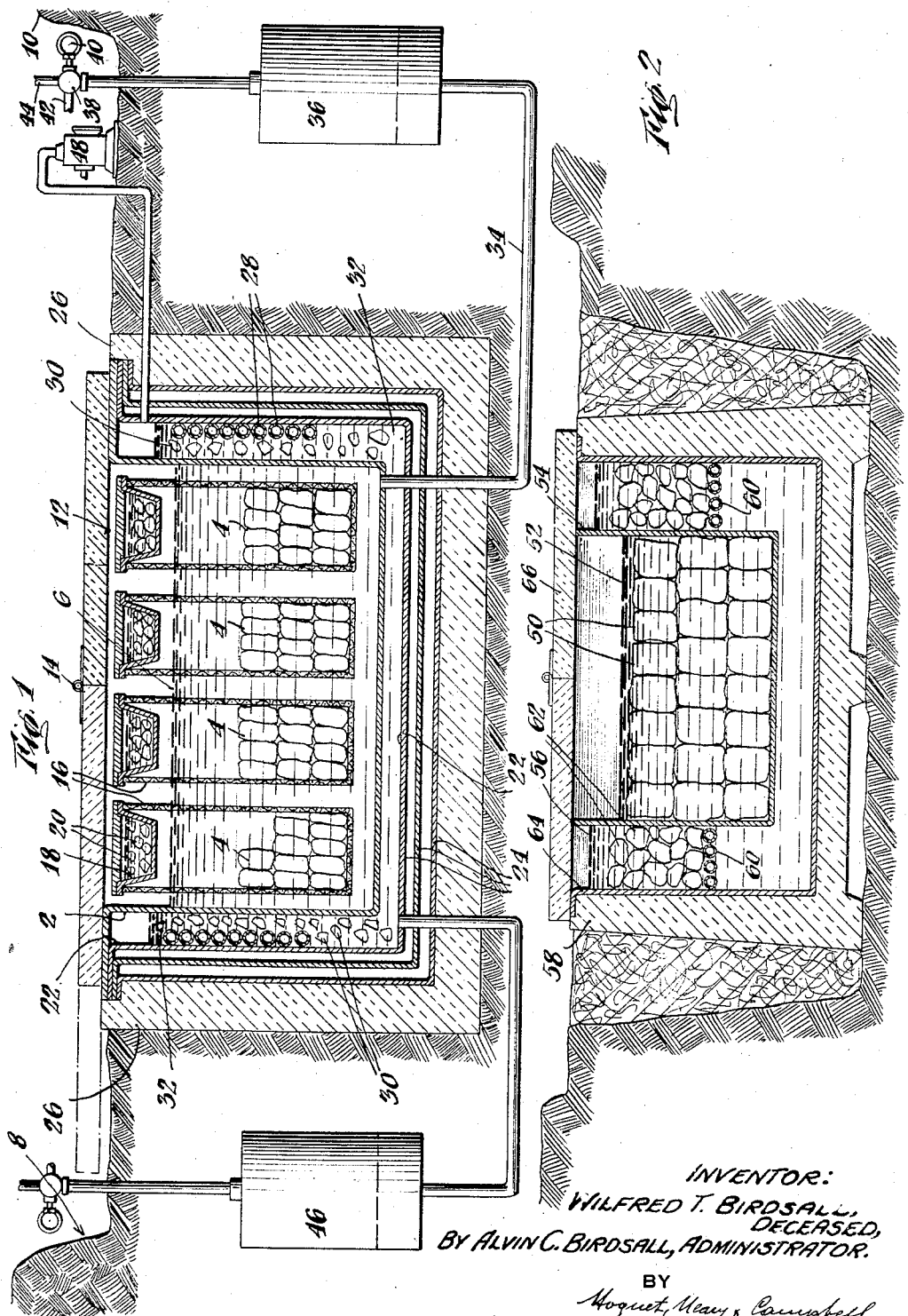

Patented Jan. 21, 1941

2,229,437

UNITED STATES PATENT OFFICE 2,229,437

MEANS FOR PRESERVATION OF LOW TEMPERATURE REFRIGERANTS

Wilfred T. Birdsall, deceased, late of Montclair, N. J., by Alvin C. Birdsall, administrator, Washington, D. C., assignor to Mergenthaler Linotype Company, Brooklyn, N. Y., a corporation of New York Application November 4, 1937, Serial No. 172,713

7 Claims. (Cl. 62—91.5)

This invention relates to the preservation of solidified or liquefied refrigerants, that is, substances which under ordinary atmospheric temperatures and pressures tend to assume a final gaseous phase by evaporating or subliming, but which have been reduced to a solid or liquid condition at a comparatively low temperature.

Most substances of this character possess vapor pressures which are comparatively high, so that unless the vapor is confined, the parent material continues to pass from a solid or liquid state into its vapor phase until it is completely dispersed. However, the dispersion of such materials does not occur when the vapor pressure, temperature, total heat content and density of the solid or liquid and its vapor are maintained at suitably related values. When such conditions are maintained, the material is in a state of thermodynamic equilibrium and does not melt into a liquid, sublime into a gas or evaporate from a liquid to a vapor phase. In general, energy in some form must be added to or subtracted from the material to upset this equilibrium when it has once been established.

These properties of the material, namely its vapor pressure, temperature, total heat content and density, possess values that apply numerically to each single pound of the material in whatever proportions it may exist as a mixture of solid, liquid and vapor. In practice, more than one pound of material is usually present and therefore the total weight and total volume of the material are characteristics of the storage conditions which also are of importance.

The relations between these six factors are exceedingly complicated and it is not possible to develop a single formula to define the relations thereof under any and all conditions. However, these factors can be fixed or established at suitable values such that the material may be preserved for long periods of time by suitably controlling the means employed in storing the material. For instance, the total heat content of the material can be changed by allowing heat to flow into or out of the material, or it can be controlled by preventing such flow of heat. Under most circumstances, a change in the total heat content of the material automatically produces a change in its temperature, vapor pressure and density and may produce a change in its total volume. The total weight and total volume of material also can be changed in such a way as to alter or control other factors important in effecting the storage of the material. For instance, by keeping the volume constant by means of a rigid steel tank, a change can be produced in the total weight by adding or removing material from the tank, whereby a change in the density, and in most cases a change in the vapor pressure of the material will result. It will thus be seen that by suitably adjusting the storage conditions, the six factors referred to above can be varied at will and can be controlled so that substantial thermodynamic equilibrium can be maintained and the material can be preserved for long periods of time.

As a matter of practical experience, it is exceedingly difficult to prevent completely the ebb and flow of energy to and from the stored material. Variations in barometric pressure, changes in temperature of the external atmosphere and other varying conditions make it extremely difficult to maintain a storage space of practical commercial size at a constantly uniform temperature and render it still more difficult to prevent the occurrence of localized differences in temperature within the storage space. This fact has heretofore prevented the successful storage of such materials as dry ice.

In accordance with the present invention, changes in the relations of the factors on which equilibrium is dependent are compensated on disturbance thereof by reversible changes in the storage conditions, whereby thermodynamic equilibrium in the stored material may be reestablished with new values for the various factors and continued evaporation or dissipation of the stored material is prevented.

Probably the most difficult factor to control in preserving low temperature refrigerants such as dry ice and liquid air is the total heat content of the material, since no heat insulation is known which will prevent the flow of any heat whatever therethrough. However, by using effective heat insulation, together with heat absorbing means, it is possible to absorb such heat as does penetrate the insulation material employed and thereby prevent change in the total heat content of the stored material due to transfer of heat thereto from external sources.

The expression "heat insulation" as here used includes not only materials of low heat conductivity such as Balsa wood, kapok, fibre, cork board and other heat insulating materials such as those described in the applicant's copending application Serial No. 172,718 filed Nov. 4, 1937, but also includes elements of construction which makes such insulation more effective. Such an element would be a layer of material of high heat conductivity such as copper disposed upon either or both surfaces of the material of low thermal conductivity in a manner to prevent localized differences in temperature gradient or heat flow, which might result in a non-uniform temperature inside the storage space with consequent destructive convection currents around the stored material. A similarly functioning element having the same purpose would be a coil of pipe forming the desired isothermal surface and filled with a mixture of a suitable volatile fluid and its vapor so that condensation of the vapor in the pipe automatically heats any portion thereof which becomes too cold, while evaporation of fluid serves to cool any point which becomes too warm. Other elements may be used as desired for securing increased insulation efficiency.

In order to absorb or divert heat which penetrates the insulation and thus protect the stored material, any of various means may be employed. When storing large quantities of dry ice, for example, the outer layers of the stored material protect the inner layers by absorbing heat as latent heat of vaporization and preventing the transfer of heat into the interior of the storage charge. Generally, however, some of the material is separated from the rest and serves as a guard ring which is sacrificed to prevent destruction of the remainder. In this way all of the stored material may be saved while the protective material which is used up eventually may be a totally different and a cheaper substance from that protected. In some cases this protective or heat absorbing material may completely surround the storage charge while in other cases it may be spaced locally and extend its protective heat absorbing surface by circulation of still another material such as a cold non-freezing fluid around the stored charge.

In still other cases, instead of using a material which absorbs the heat by a change of state, it may be desired to circulate a fluid which absorbs the undesired heat by physical or chemical action. For instance, benzol, wax-free mineral oil distillates and many other materials when passed over the surface of solid dry ice dissolve some of the dry ice and reduce its surface temperature. By the circulation of such a liquid about the stored material, heat may be removed by a complex physical and perhaps chemical reaction. The liquid which produces this result can be reactivated with the evolution of the dissolved refrigerant in vapor form by a slight warming so that it can be circulated continuously.

Since the class of materials to which this invention relates has a comparatively high vapor pressure under all storage conditions of practical importance, an atmosphere of vaporized material surrounds every lot which is placed in storage. The pressure of this vapor is one of the factors that must be controlled to prevent disintegration of the stored material and therefore it is necessary to retain this vapor and prevent it from passing off in an unrestricted manner and to prevent it from becoming diluted with air from the surrounding atmosphere. For this reason, the present invention further contemplates the use of an envelope which surrounds the stored charge. This envelope may have many forms. For instance, it may be of fixed or variable volume, it may be rigid or elastic in structure and, under some conditions, may permit the escape of gases or vapor while preventing their entrance to the stored material. In other cases it may be merely a covering of diffusion-retarding material such as a pile of sand or sawdust covering the stored dry ice.

From the foregoing discussion it will appear that the present invention for the preservation or storage of such materials as solid carbon dioxide or liquid air or the like involves three important features; first, the maintenance of the stored material substantially in a state of thermodynamic equilibrium by suitably controlling the physical factors mentioned above to maintain them at suitably related values; second, localizing or preventing disturbance of this equilibrium by the passage of heat to or from the stored material by the use of insulation and the removal or diversion of heat which penetrates the insulation; and third, the prevention of loss by diffusion of the gaseous portion of the stored material by the use of a suitable surrounding envelope.

The invention may be practiced in the commercial storage of many materials such as dry ice, liquid air, or the like, and there may be great variation in the methods and means utilized to adapt the invention to any given storage conditions or needs. Typical commercial examples of these needs are: a need to utilize the smallest possible amount of heat insulating material; a need to utilize an available container of fixed volume for storage purposes; and a need to minimize the loss of stored material which may occur in establishing a state of equilibrium between the stored material and the desired storage conditions. It may also be desirable to utilize certain factors such as barometric pressure, volume of available storage space, temperature of available refrigerating means, etc., in the external control of equilibrium. Therefore, it will be apparent that the present invention may take any of various forms and it should therefore be understood that those embodiments thereof hereinafter specifically described are given by way of illustration and are not intended to limit the scope of the invention.

Each of Figures 1 to 4 inclusive of the accompanying drawings is a diagrammatic representation of a different and alternative form of means adapted for use in the practice of the present invention.

In that form of the invention chosen for illustration in Figure 1, a tank or storage chamber 2 formed either of metal or of insulating material contains material 4 which may be dry ice, liquid air or the like which it is desired to store. The material is shown as a solid immersed in a medium 6 such as a liquid, semi-liquid or plastic substance, preferably of the type described in the copending application Serial No. 172,714 filed Nov. 4, 1937, entitled "Diffusion resisting envelope." When the material to be preserved is a liquid, the medium 6 employed should be immiscible with the stored liquid and should differ in density therefrom so as to cover the stored liquid and prevent or resist diffusion of its vapor.

The chamber 2 preferably is located in a depression 8 in the earth 10 so that a blanket of cool or cold air or gas collects in the depression over the tank and aids in insulating the upper surface of the medium. A suitable heat insulating cover 12 for the tank 2 is provided for the tank and is formed in two sections and hinged at 14 in the center so that either side may be raised while the other side remains in place, exposing either half of the tank for removal or introduction of the material to be stored. The cover also is slidable so that when one side is raised and the cover shifted to the dotted line position shown, the central portion of the tank is uncovered, permitting material to be introduced or removed from the central portion of the tank. This is particularly desirable when, as shown, the material within the tank is arranged in foraminous containers 16 each of which holds a number of blocks of dry ice. Such containers facilitate handling of the material and may, of course, be constructed and arranged as desired to aid in draining of liquid therefrom on removal from the tank. The cover should, therefore, be constructed to enable those containers in the central portion of the tank to be removed without difficulty. Means such as containers 18 with removable covers receive broken dry ice 20 or other refrigerants which serve to absorb any heat tending to flow inwardly at the upper surface of the medium. These containers cover the containers 16 and are readily accessible for renewing the supply of refrigerant thereto as required to absorb heat which penetrates the cover 12.

Due to the very low temperature of the stored material when preserved under atmospheric pressure or under similar relatively low pressures, it ordinarily is desirable also to employ additional means serving to absorb heat which penetrates insulation about the sides and bottom of the tank 2.

For this purpose, an outer heat insulating casing 22 is provided. This casing is shown as formed of parallel metal sheets 24 spaced apart by intervening air or gas filled spaces. A casing of this type serves to prevent transfer of heat by radiation and also serves to prevent or impede transfer of heat from one sheet to another by convection currents in the gas between the same. The casing is surrounded by an outer shell 26 constructed of insulation such as Balsa wood, or of material such as concrete, tile filled with kapok, saw-dust, or other heat insulating material.

Between the casing 22 and the tank 2, are located heat absorbing means which, as shown, comprise a coil of pipe 28 and broken refrigerant 30, such as dry ice, immersed in a liquid or other medium 32. The coil may be supplied with a volatile liquid refrigerant or with other means for absorbing or removing heat which penetrates the casing 22. The heat absorbing means may also be used to establish equilibrium conditions in starting operation by removing heat from media 6 and 32 so as to reduce the same to a temperature in the neighborhood of that of the material to be stored. The medium 32 between the casing 22 and the tank 2 may be the same or similar to the medium 6 if desired or may be of any other suitable type. The dry ice absorbs heat as latent heat of vaporization being converted from a solid to a gas which passes off through medium 32 while the coil 28 absorbs and removes heat by ordinary methods of refrigeration and heat transfer.

In employing the device illustrated in Figure 1 in the preservation of dry ice, the tank 2 and medium 6 are initially cooled to a temperature in the neighborhood of that of the dry ice. The medium 32 between shell 22 and tank 2 is also cooled to the same temperature by the broken dry ice 30 or the refrigerating coil 28 or both and the apparatus thoroughly chilled so as to produce a stable condition. The material 4 is then introduced into the tank 2 either in the containers 16 or in separate blocks as desired. If preferred, however, the tank 2 first may be charged with the dry ice and the medium 6, pre-cooled to the temperature of the dry ice, may be then introduced through the conduit 34 or otherwise after the blocks or containers are in place. The conduit 34 also serves as a means for drawing off the medium from tank 2 at the end of a storage period to facilitate removal of the material. After charging the tank, the containers 18 are charged with broken dry ice to prevent transfer of heat to the upper surface of the medium in the tank and the cover 12 is applied.

In immersing material in the medium 6 or in applying the medium to the material, an envelope is formed about the material in which vapor of the material is always present due to the high vapor pressure thereof as more fully described in the copending application Serial No. 172,714 referred to above. In this way the presence of two phases of the material within the envelope is assured, these being the solid and vapor phases in the case of carbon dioxide. The vapor produced would be dissipated causing additional material to evaporate to replace that dissipated so that an unstable condition would persist until the material was entirely converted to vapor were it not for the envelope produced by the medium 6 which surrounds the material and serves to resist or prevent diffusion of the vapor. In this way an atmosphere of carbon dioxide gas is produced and maintained in contact with the solid. Thus one of the two above mentioned elements of the invention other than the maintenance of thermodynamic equilibrium are provided by the diffusion resisting envelope formed in the medium 6.

In order to maintain thermodynamic equilibrium between the phases of the material within the envelope it is necessary to subject the envelope to an external pressure equal to the vapor pressure of the material at the storage temperature, or conversely, to maintain the material at such a temperature that the vapor pressure of the material will not exceed the external pressure. When the external pressure is atmospheric pressure as in the above described storage apparatus of Figure 1, the temperature of storage for dry ice must be −109° F. or lower to avoid the formation and escape of bubbles of carbon dioxide gas from the material with resulting continued unbalance and loss. As long as the system is maintained at this low temperature and the external pressure is constant, the volume, density, total heat etc. of the material remain unchanged and equilibrium is maintained.

The avoidance of heat transfer to the material is effected in the construction of Fig. 1 by the heat insulating casing 22, medium 32 and medium 6 in contact with the material, as well as by the cover 12 and the blanket of cold air in depression 8 in the surrounding earth 10, all of which act as heat insulators. The heat absorbing elements consisting of the dry ice containers 18, the broken dry ice 30 and heat absorbing coils 28 in the medium 32 serve to absorb such heat as penetrates the insulation and when suitably operated may prevent any heat whatever from reaching the material 4 from external sources. Elements 28 and 30 and the use of a metallic tank and a metallic lining for the casing 22 also serve to prevent the occurrence of localized differences in temperature throughout the tank contents by causing distribution of heat and greater evaporation of the heat absorbing refrigerant in those areas which are at higher temperature or to which a greater amount of heat is transmitted. Uniformity of temperature and a positive barrier to heat transfer beyond the same are thus provided.

If mechanical energy in the form of changing pressure or volume or the removal of material do not take place during the storage operation, all of the elements upon which storage is dependent are fully provided. However, in practical operation with a storage tank of the type shown in Figure 1, changes in atmospheric pressure take place frequently and as a result the total heat, vapor pressure, density, etc., of the stored material all change automatically tending to restore equilibrium. The effect of such changes is overcome in the construction described by the refrigerant or coil in medium 32 which give up heat to or absorb heat from said medium, thereby absorbing and removing from the system the same amount of energy as such external forces remove or supply to the system. As alternative or supplementary means for opposing the effect of variations in atmospheric pressure, the level of the liquid or medium 6 within the tank 2 may be altered in such a way that the total pressure (atmospheric and hydrostatic) to which the material in the tank is subjected remains constant. This may be effected by supplying or removing liquid through the conduit 34 from time to time by the use of a supply chamber 36 from which liquid is passed to tank 2 under the control of a valve 38 actuated by a pressure responsive device 40. The valve 38 communicates with a compressed air line 42 and an exhaust line 44. A reduction in atmospheric pressure actuates the pressure responsive device 40 and valve 38 to apply compressed air to chamber 36 whereby liquid is forced from chamber 36 to tank 2 increasing the depth and hydrostatic pressure of the liquid on the stored material to such an extent that the total pressure (hydrostatic and atmospheric) is maintained constant. Similarly, if the atmospheric pressure increases the pressure responsive device 40 and valve 38 are actuated to open the exhaust line 44 relieving the pressure on the liquid in the chamber 36 so that liquid drains from the tank 2 to chamber 36 reducing the depth and hydrostatic pressure of the liquid on material in the tank to such an extent that the total hydrostatic and atmospheric pressure remain constant.

The substitution of a temperature responsive device for the pressure responsive device 40 may be made in those constructions wherein it is desired to vary the rate of heat absorption in response to change in atmospheric temperature. In this way, any deficiency in insulation may be compensated by a corresponding increase in the pressure and temperature of the stored material or an increase in the rate of heat absorption by the surrounding dry ice.

By the use of such control mechanism compensating for variations in conditions external to the system, equilibrium either is not disturbed at all or is automatically reestablished from time to time. In reestablishing equilibrium the factors controlling the same may assume new values which, although different from the original values, bear such relations to each other that continued unbalance does not occur and the material is preserved without loss. It will therefore be seen that all those elements necessary for the preservation of materials such as dry ice are provided and the material may be stored for long periods of time on a commercial scale under external conditions which change from time to time with changing seasons, changing atmospheric pressure and the like.

In starting operation the medium 6, and other elements of the apparatus are not ordinarily at exactly the same temperature as the material stored so that the evolution of gas is usual and this condition continues, although very slowly for some time. Moreover, due to the thickness or volume of the media 6 and 32, their high heat storing capacity and low rate of heat transfer, equilibrium is only established slowly and can only be reestablished slowly. In practice therefore, changes in those factors upon which equilibrium is dependent often occur more rapidly than in the compensating forces serving to reestablish equilibrium. For this reason, there may be a slow and continuous hunting of the compensating forces at values above and below those representing conditions of perfect equilibrium. Thus, although there may be a slight unbalance in the system during a great part of the period of storage there is nevertheless an average state approaching ideal conditions or thermodynamic equilibrium such that losses which actually do occur are reduced to a minimum and a practical commercially operative system of storage is provided.

In the use of the apparatus illustrated in Figure 1, it is also possible to maintain the material 4 under considerable hydrostatic pressure so that the temperature of the material will tend to assume a temperature somewhat higher than −109° F. The amount of this hydrostatic pressure and therefore the temperature of the preserved material may be varied as desired by control of the depth of the liquid above the stored material. Furthermore, in order to assure the most effective heat absorbing function of the broken dry ice in the medium 32 between the casing 22 and the tank 2, it is possible to vary the depth of the liquid or medium 32 by suitable control means 46 which as illustrated, are similar in character to the tank 36, valve 38 and related elements, and are responsive to change in either atmospheric pressure or atmospheric temperature. Thus, for example, the level of the liquid 6 within the tank 2 may be considerably higher than the level of the liquid 32 between the tank 2 and the casing 22, so that the temperature of material in the liquid 6 will tend to be somewhat higher than the temperature of the broken dry ice 30 in the medium 32. In this way, any tendency for heat to flow inward to the stored material 4 from the medium 32 and broken dry ice 30 will be overcome and the temperature of the stored material may be maintained sufficiently high to insure effective preservation thereof under the conditions of storage.

As an alternative arrangement to insure the preservation of the material 4 the broken dry ice 30, in medium 32 between the tank 2 and casing 22 may be subjected to pressure either above or below atmospheric pressure so as to increase or decrease the rate of evaporation of the broken dry ice and correspondingly control the temperature of the medium 32. For this purpose, a conduit is connected to an atmospheric temperature and pressure responsive exhauster or compressor 48 and with the upper portion of the closed space between the tank and casing 22. When it is desired to maintain the temperature of the medium 32 below −109° F., so as to permit the use of thin and therefore relatively inefficient insulation about the casing 22, the device 48 is operated to the exclusion of the control means 46 as a pump to reduce the pressure to which the broken dry ice in the medium 32 is subjected, whereas, if it is desired to maintain the medium 32 at a temperature somewhat above −109° F., the broken dry ice 30 and medium 32 are subjected to a pressure above atmospheric pressure, thus decreasing the rate of evaporation of the broken dry ice and raising the temperature of the medium 32.

The use of control mechanism such as the chamber 36, the chamber 46 and the compressor-exhauster 48 are optional and are here described merely as typical forms and constructions of control mechanism that may be used in conjunction with the apparatus of Figure 1, in order to oppose or compensate for variations in conditions external to the system, or in order to preserve the stored material at temperatures above or below that temperature which the material tends to assume when subjected to atmospheric pressure.

In the foregoing description of the apparatus shown in Figure 1, it has been indicated that the temperature which the stored material tends to assume increases with an increase in pressure. As a result of this characteristic it will be evident that the material in the lower portion of tank 2, which is under greater hydrostatic pressure than material near the top of the tank, tends to assume a higher temperature than the material at the top thereof. It will therefore be desirable when using a deep storage tank to provide more effective heat insulating or heat absorbing means for the material in the upper portion of the tank. The construction illustrated in Figure 2, which is a modification of the construction of Figure 1, may be embodied directly in the construction of Figure 1 if desired, or may be used independently of the previous construction. As shown, the dry ice or other stored material 50 is immersed in a medium 52 within a tank 54 about which are heat insulating or heat absorbing means which may be a liquid or other medium 56 between the walls of the tank 54 and an external casing 58. A previous support 60 is located between the tank and casing above the bottom of the tank so as to support broken dry ice 62 in a ring about the upper portion of the tank 54. In this way, the transfer of heat to the stored material adjacent the top of the tank is reduced or eliminated and at the same time the medium 52 is chilled sufficiently to insure the preservation of the material in the lower portion of the tank.

The form and construction of the tank 54 and casing 58 may, of course, be varied as desired and may either be in the form shown in Figure 1 or may as illustrated in Figure 2 comprise a metal tank 54 and a concrete casing 58 surrounded by kapok or other heat insulating material as desired. Preferably the inner surface of the casing 58 is provided with a layer of metal or other material 64 which is a good heat conductor to provide an isothermal surface to insure the maintenance of substantially uniform external temperature conditions.

The tank 54 preferably is provided with a cover 66 and may, if desired, have additional means for preventing transfer of heat to the upper surface of the material such as that described in connection with Figure 1.

In Figure 3 of the drawings a further alternative embodiment of the invention is illustrated which is particularly adapted for use in the storage of small quantities of dry ice, although the principle and construction thereof are equally applicable to the preservation and storage of large quantities of material. As illustrated, the device embodies an outer casing 70 formed of Balsa wood or other suitable heat insulating material with a central cavity 72 having a metallic or other lining 74 lying closely adjacent the heat insulating casing. The dry ice or other material 76 to be preserved is shown in the form of blocks located within a receptacle 78 formed of insulating material and provided with a hinged opening 80 in the bottom thereof. A valve or closure member 82 is carried by the receptacle and serves to close the opening 80 when the receptacle is in position. A liquid medium 84 fills the interior of the receptacle 74 and surrounds the blocks of dry ice in the receptacle 78. However, this liquid drains easily away from the block when the receptacle is raised, due to opening of the closure member 82 so that the blocks and receptacles can be easily introduced and removed without removing liquid from the shell 74.

A second metallic member 86 is positioned about the receptacle 78 and spaced therefrom so as to provide a passage 88 between the member 86 and the receptacle 78. The lower portion of the member 86 is formed with an opening 90 about which are supporting members 92 upon which rests a block 94 of dry ice. Spaced supporting members 96 are also provided for holding the member 86 in spaced relation to the metallic lining 74 of the cavity 72.

In this construction the material 76 to be stored is placed in the receptacle 78 and introduced into the member 86 into contact with the block of dry ice 94 which has previously been placed on the spaced supports 92 about the opening 90 in the bottom of member 86.

During storage of the material the dry ice 94 evaporates as rapidly as heat is conducted through the walls of the casing, giving off carbon dioxide gas which forms a foam within the channel 88 between the receptacle 78 and member 86. The medium 84 in channel 88 therefore rises adjacent the outer surface of the receptacle 78, passing in at the bottom opening 90 and over the block of dry ice 94 as it passes upwardly. Upon reaching the surface of the medium 84 those bubbles contained in the liquid pass off and a column of liquid substantially free from bubbles passes downwardly between the outer wall of member 86 and the metallic liner 74 of the cavity 72. In this way, a continuous but slow circulation of the medium 84 within the storage device takes place in such a way as to maintain a blanket of liquid and gas directly in contact with the exterior of the receptacle 78.

Convection currents occurring in the outer portion of the chamber do not serve to transfer heat to the stored material since any heat carried by the liquid flowing upwardly about the receptacle 80 is absorbed by the block of dry ice 94 and converted into latent heat of vaporization. As the operation continues the material of block 94 is gradually removed in the form of vapor and the block decreases in size so that the receptacle 78 and its contents are lowered within the cavity. Additional dry ice 98 may then be added from time to time at the top of the receptacle so as to prevent undue rise in temperature of the circulating liquid.

Any suitable form of control mechanism may be provided for compensating for variation in atmospheric pressure or for other influences tending to add or withdraw energy from the system. Typical of such control mechanism are the liquid level control devices illustrated and described in connection with the construction of Figure 1.

The construction of Figure 3 thus provides each of the elements referred to above as requisites for the preservation of material such as dry ice, namely, a diffusion resisting envelope in the form of medium 84 and means serving to maintain the pressure, temperature, total heat and other factors upon which thermodynamic equilibrium is dependent in fixed relations, comprising insulation and devices for preventing the transfer of energy in the form of heat to the material being stored.

In each of the forms of the invention illustrated and described in connection with Figures 1, 2 and 3, the material is stored under substantially atmospheric pressure. In most instances such methods of storage are preferred because the material is preserved in a manner which does not sacrifice the high refrigerating value thereof. However, in some instances, it is desirable to maintain the material under a pressure above atmospheric pressure and at a correspondingly higher temperature in order to reduce the amount of insulation or heat absorption material required to preserve the stored material. In some instances, it may also be desired to store the material under a partial vacuum and at a lower temperature to obtain greater refrigeration value therefrom. Either method may be employed when using the apparatus illustrated in Figures 1, 2 and 3 by securing the covers to the respective tanks 2, 54 and 74 by means of releasable bolts or connections using gaskets or other means to insure a gas type enclosure for the preserved material.

An alternative construction for maintaining the material under pressure above or below atmospheric pressure is shown in the construction of Figure 4 hereafter described.

In the construction of Figure 4, an alternative form of chamber 110 is shown having a movable cover formed by the casing 112, the edges of which are sealed by immersion in a liquid 114. The weight of the casing 112 is counterbalanced by a weight 116 which is adjustable to impose on the stored material any suitable or desired pressure. In this way, the volume of the stored material may be varied while the pressure may be held constant so as to maintain equilibrium conditions between the solid and/or liquid and the vapor phases of the preserved material. The chamber 110 and casing 112 preferably are surrounded by a liquid medium 118 provided with cooling coils, broken dry ice, or other heat absorbing means 120 serving to absorb heat which tends to flow inwardly through the walls 122 of an outer receptacle toward the stored material.

This construction is adapted for the storage of liquid air as well as solid refrigerants such as dry ice, and as in the forms of devices previously described, diffusion resisting medium 124 may be employed in contact with the stored material if desired.

Suitable control mechanism may also be applied to constructions of this character and as shown, an element 126 is located within the chamber 110. This element may be responsive to either the pressure or the temperature of the stored material and as shown, is electrically connected by conductors enclosed within a conduit 123 to a pair of control switches 136, 137. Switch 136 is connected by conductors 128 to a valve 130 controlling the level of the medium 124 in the chamber 110 to vary the pressure to which the material is subjected and to aid in maintaining equilibrium between the stored material and its vapor. The other switch 137 is connected by a conductor 132 to a compressor 134 of a refrigerating system which includes an expansion valve 134a, the coils 120, and a condenser 134b to vary the rate at which a refrigerant is circulated through the coils 120. The circuit through the various control elements is completed by a pair of conductors 133, 135, conductor 133 being connected to the other side of the compressor 134 and conductor 135 being connected to switch 137. The switches 136 are adapted and arranged to render either the valve 130 or the compressor 134 operative or to cause both to be actuated to control the storage conditions, whereby the factors upon which thermodynamic equilibrium is dependent may be suitably altered to maintain equilibrium under all conditions of storage and to retard or eliminate the transfer of heat to the material as desired.

In those forms of the invention described above, wherein broken dry ice or the like is used as a heat absorbing means, a diffusion resistant medium may be employed in contact therewith, or the dry ice may be used without such a medium. In cases where it is desired to increase the evaporation of the broken dry ice and thereby increase the rate of absorption of heat thereby the pressure applied thereto may be reduced as described in connection with Figure 1 or a solvent may be passed in contact with the broken dry ice in place of the diffusion resisting medium, whereby the vapor about the material is rapidly removed and the rate of evaporation increased.

While a number of alternative methods and means for use in the practice of my invention have been illustrated and described, it will, of course, be understood that these have been selected for illustrative purposes only to indicate representative embodiments of the invention, and each is capable of numerous changes and modifications in the mechanical elements employed and the methods of using the same. In view thereof, it should be clearly understood that the invention is not limited to those forms thereof shown and referred to herein, except as defined by the claims.

What is claimed is:

1. Apparatus for storing material which has a vapor pressure higher than atmospheric pressure at atmospheric temperatures, comprising a chamber containing a liquid forming an envelope enclosing the material to be stored, insulation spaced from said chamber and embodying an element forming an isothermo surface about said envelope, means located between said insulation and envelope for establishing conditions within said envelope approaching thermodynamic equilibrium and mechanism responsive to change in said conditions for varying the operation of said means.

2. Apparatus for storing material which has a vapor pressure higher than atmospheric pressure at atmospheric temperatures, comprising a chamber containing a liquid forming an envelope enclosing the material to be stored, insulation spaced from said chamber and embodying an element forming an isothermo surface about said envelope, means located between said insulation and envelope for establishing conditions within said envelope approaching thermodynamic equilibrium and mechanism responsive to change in conditions external to said envelope which tend to destroy said equilibrium for varying the operation of said means.

3. Apparatus for storing material which has a vapor pressure higher than atmospheric pressure at atmospheric temperatures, comprising a closed chamber of variable volume containing material to be stored, elements for maintaining material within said chamber under substantially constant pressure, means for establishing conditions within said chamber approaching thermodynamic equilibrium and a mechanism responsive to change in said conditions for varying the operation of said means.

4. Apparatus for storing materials which tend to evaporate or sublime under ordinary conditions of atmospheric pressure and temperature comprising an envelope of variable volume enclosing the material to be stored and formed to permit the passage of gas outwardly from said envelope while preventing the admission of gas thereto, means preventing free flow of heat to the material in said envelope and mechanism controlled by atmospheric conditions for establishing a condition approaching thermodynamic equilibrium in the material in said envelope.

5. Apparatus for storing materials which tend to evaporate or sublime under ordinary conditions of atmospheric temperature and pressure comprising an envelope enclosing the material to be stored and adapted to conform to the shape of said material, insulating means preventing free flow of heat to the material in said envelope, heat absorbing means extending about said envelope and located within said insulating means and mechanism for varying operation of said heat absorbing means in response to change in atmospheric conditions to maintain a condition approaching thermodynamic equilibrium in the material in said envelope.

6. Apparatus for storing materials which tend to evaporate or sublime under ordinary conditions of atmospheric pressure and temperature comprising an envelope embodying a highly viscous liquid enclosing the material to be stored, means preventing free flow of heat to the material in said envelope and mechanism responsive to change in atmospheric pressure for varying the hydrostatic pressure to which material in said envelope is subjected to maintain the material therein in a condition approaching thermodynamic equilibrium.

7. Apparatus for preserving material which tends to evaporate or sublime under ordinary conditions of atmospheric pressure and temperature comprising a storage chamber for receiving the material to be preserved, heat absorbing means extending about said chamber and including material similar to that within said chamber, a diffusion resisting liquid enclosing the material in said chamber and that in said heat absorbing means and means responsive to change in atmospheric conditions for independently varying the hydrostatic pressure of the diffusion resisting liquid on material in said storage chamber and in said heat absorbing means.

ALVIN C. BIRDSALL.
*Administrator of the Estate of Wilfred T. Birdsall, Deceased.*